United States Patent [19]

Mauro

[11] Patent Number: 5,288,449
[45] Date of Patent: Feb. 22, 1994

[54] DEVICE AND METHOD FOR PERSONALIZING TIRES

[76] Inventor: Charles R. Mauro, 3605 Union Ct., Wheatridge, Colo. 80033

[21] Appl. No.: 904,189

[22] Filed: Jun. 24, 1992

[51] Int. Cl.$^5$ .................. B29C 45/16; B29D 30/72
[52] U.S. Cl. ........................... 264/219; 156/116; 156/421.6; 264/328.3; 264/DIG. 46; 264/259; 425/543; 425/DIG. 13
[58] Field of Search ............... 264/248, 259, 236, 347, 264/328.2, 328.3, DIG. 46, 219; 156/116, 421.6; 425/543, DIG. 13

[56] References Cited

U.S. PATENT DOCUMENTS

| | | | |
|---|---|---|---|
| 4,041,652 | 8/1977 | Graven et al. | 156/116 |
| 4,139,592 | 2/1979 | Gallizia | 264/328.3 |
| 4,317,479 | 3/1982 | McDonald | 156/116 |
| 4,318,436 | 3/1982 | Shurman | 156/116 |
| 4,604,256 | 8/1986 | Greenwood et al. | 264/328.3 |

FOREIGN PATENT DOCUMENTS

| | | | |
|---|---|---|---|
| 3046664 | 7/1982 | Fed. Rep. of Germany | 156/116 |
| 53-25678 | 3/1978 | Japan | 264/236 |

*Primary Examiner*—Jeffery Thurlow
*Assistant Examiner*—Mathieu Vargot
*Attorney, Agent, or Firm*—John L. Isaac

[57] ABSTRACT

A device for producing raised lettering on elastomeric tires is provided. The device includes a mold member sized and shaped to receive at least a portion of the sidewall of an elastomeric tire. A channel is disposed along the interior surface of the mold member. A plurality of insert members for positioning in the channel are provided with each insert member having a face engraved with the mirror image of a pre-selected alpha-numeric symbol to form a female alpha-numeric mold therein. A tracking mechanism is positioned along the channel to align and positionally maintain the insert members therein to form a series of symbols into a pre-selected legend or marking. Finally, a mechanism is provided for injecting heated vulcanizing rubber into the symbol molds as the sidewall of the elastomeric tire is in contact with the faces of the insert members and to fuse the injected rubber to the sidewall to produce raised alpha-numeric lettering of a preselected pattern on the sidewall of the tire.

14 Claims, 4 Drawing Sheets

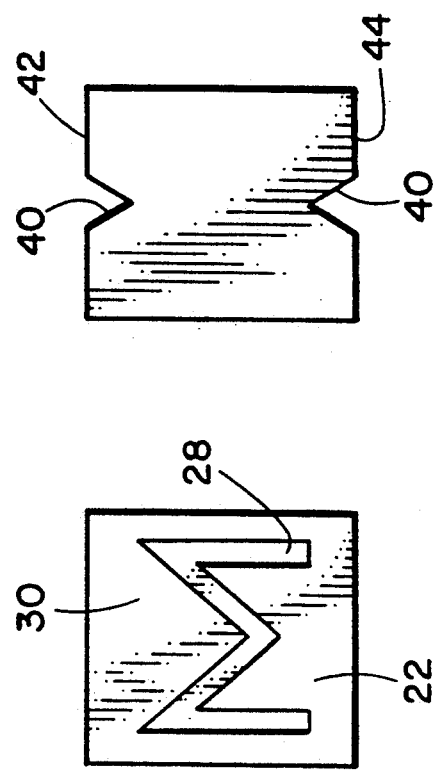
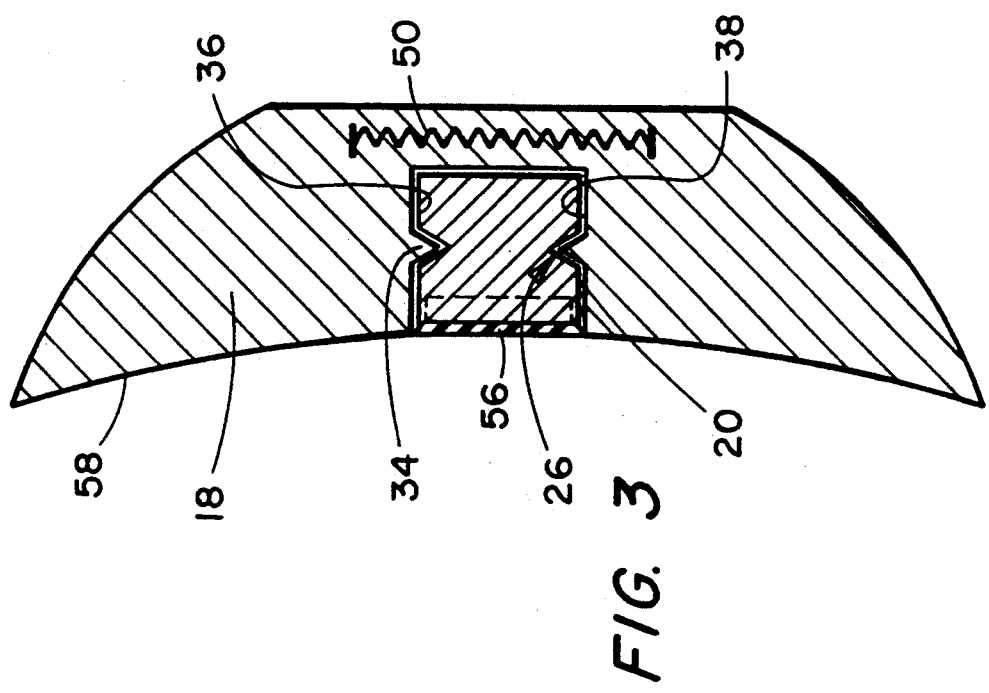
FIG. 4
FIG. 3

DEVICE AND METHOD FOR PERSONALIZING TIRES

BACKGROUND OF THE INVENTION

1. Field of the Invention

The present invention relates generally to devices and techniques for manufacturing tires and, more particularly, to devices and techniques for applying legends and symbols on the sidewalls of vehicular tires. Specifically, the present invention relates to a device and method for aftermarket application of raised lettering on the sidewalls of existing vehicular tires.

2. Description of the Prior Art

Since the advent of vehicular rubber tires, it has been desirable to place some sort of legend or symbol on the sidewalls of the tires. Such symbols and legends have included information about the tire, such as pressure ranges, the construction and the like, as well as manufacturer identification, trademarks and the like. Consequently, numerous techniques have been developed for the application of symbols or various marking inditia on the sidewalls of vehicular tires.

U.S. Pat. Nos. 3,232,816 and 3,729,041 both disclose techniques for applying "whitewall" type strips to the sidewalls of tires. One method of applying inditia or markings to the sidewalls of tires is to incorporate such markings in the original molding for the tire casing and is applied when the tire is being initially formed. U.S. Pat. Nos. 3,518,335, 3,769,123, 4,279,286, 4,343,342, 4,442,618 and 4,615,101 all disclose devices and techniques for applying designs, legends or other marking inditia on the sidewalls of tires during the formation of the original tire casing.

Another manner of applying markings and inditia to the sidewalls of tires is to engrave the same into the sidewall of the tire after formation of the tire. U.S. Pat. Nos. 1,567,402, 1,576,156, 3,225,810, 4,041,652 and 4,823,856 all disclose devices and techniques for performing such as engraving-type marking.

Yet another technique for applying markings and inditia to the exterior surface of the tire is by applying individual letters, decals or appliques to the exterior sidewall of the sidewall. These appliques can be in the form of sheets or individual letters heated and compressed or adhered with adhesive to the tire sidewall. Examples of such devices and techniques include U.S. Pat. Nos. 1,448,286, 1,852,964, 4,252,589, 4,198,774, 4,256,159, 4,311,181, 4,317,479, 4,318,436, 4,401,145, 4,461,795, 4,684,420, 4,967,818, 5,047,110, 5,049,220 and 5,058,647. While this last group of devices and techniques enable the individualization of vehicular tires due to the application of the marking inditia after formation of the tire, the devices and techniques usually require formation of the elastomer decals first followed by application of the decal or of individual letters one at a time through heat and/or adhesive, which again is time consuming. Moreover, many of these latter techniques, including those of utilizing adhesives, do not form an integral bond between the marking inditia and the sidewall.

U.S. Pat. No. 1,371,501 discloses a technique for utilizing a mold having removable mold members for applying marking inditia to the sidewall of the tire in an aftermarket application. However, this device and technique also requires the formation of individual metal units incorporating the entire marketing inditia, which is then useful only for applying that one particular legend or marking. This, again, is a costly and time consuming process and technique.

In today's vehicular market, there is strong desire for personalizing automobiles through the use of personalized license plates and the like. While it would be highly desirable to be able to personalize vehicular tires to include aftermarket manufacturing identification or an individual vehicle owners identification or statement, there is not yet available a device or technique for enabling the aftermarket application of personalized marking inditia which is quick and inexpensive.

SUMMARY OF THE INVENTION

Accordingly, it is one object of the present invention to provide a device for producing raised lettering on elastomeric tire sidewalls.

It is another object of the present invention to provide a device for personalizing vehicular tires.

It is yet another object of the present invention to provide a device and technique for the aftermarket application of marking inditia to the sidewalls of vehicular tires, which device and technique is inexpensive, rapid and on site.

It is a further object of the present invention to provide a device and technique for the application of marking inditia to the sidewall of vehicular tires, which device and technique may permit such application without the removal of the tire from the vehicle.

To achieve the foregoing and other objects and in accordance with a purpose of the present invention, as embodied and broadly described herein, a device for producing raised lettering on elastomeric tires is provided. The device includes a mold member sized and shaped to receive at least a portion of the sidewall of an elastomeric tire. A channel is disposed along the interior surface of the mold member. A plurality of insert members for positioning in the channel are provided with each insert member having a face engraved with the mirror image of a pre-selected alphanumeric symbol to form a female alphanumeric mold therein. A tracking mechanism is positioned along the channel to align and positionally maintain the insert members therein to form a series of symbols into a preselected legend or marking. Finally, a mechanism it provided for injecting heated vulcanizing rubber into the symbol molds as the sidewall of the elastomeric tire is in contact with the faces of the insert members and to fuse the injected rubber to the sidewall to produce raised alpha-numeric lettering of a preselected pattern on the sidewall of the tire.

BRIEF DESCRIPTION OF THE DRAWINGS

FIG. 3 is a cross-sectional view taken substantially along line 3—3 of FIG. 2;

FIG. 4 are front and side perspectives of the insert members utilized in the present invention.

DETAILED DESCRIPTION OF THE PREFERRED EMBODIMENTS

Figure 1:
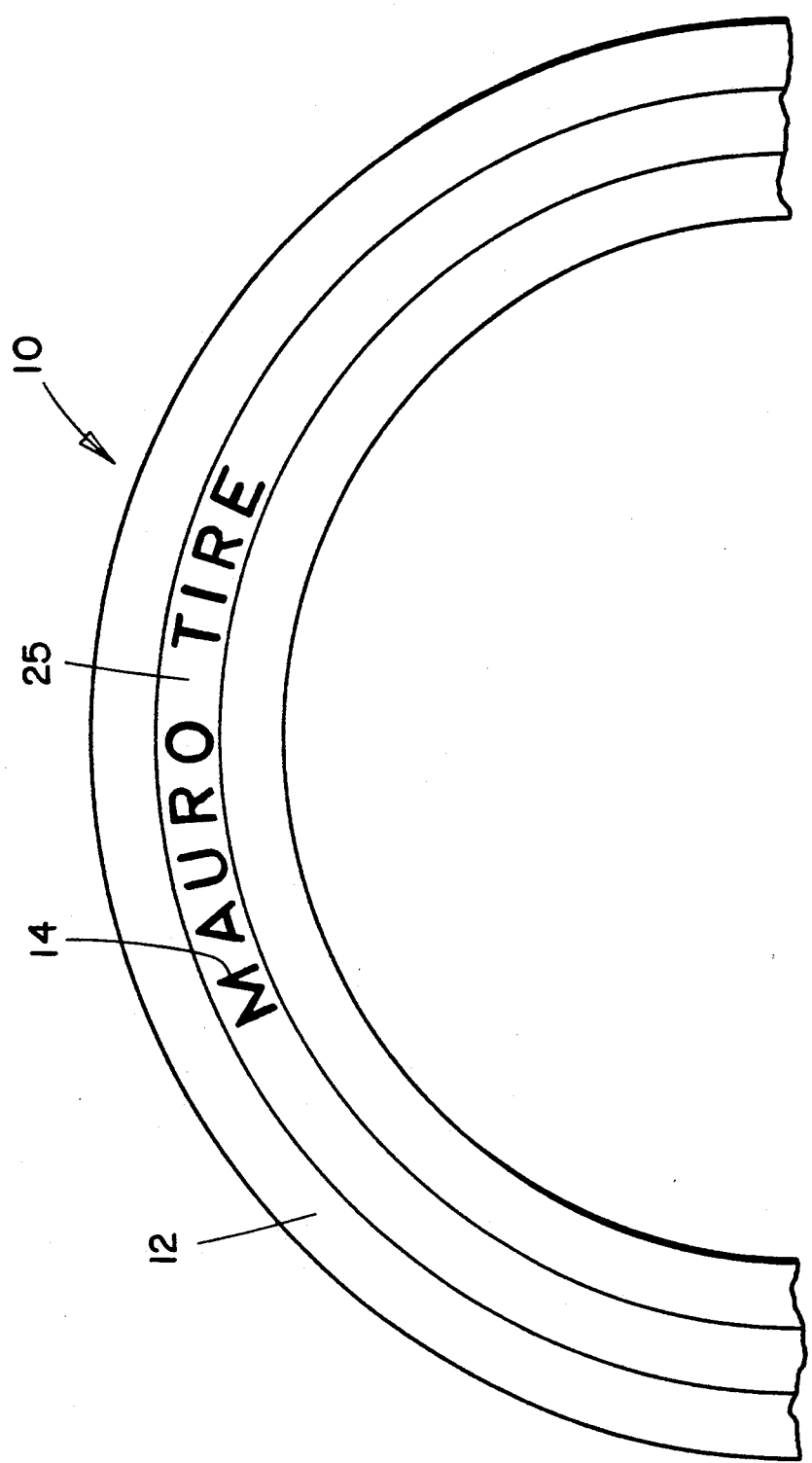
FIG. 1 is a side schematic view of a portion of the sidewall of a vehicular tire marked utilizing the present invention.
Figure 2:
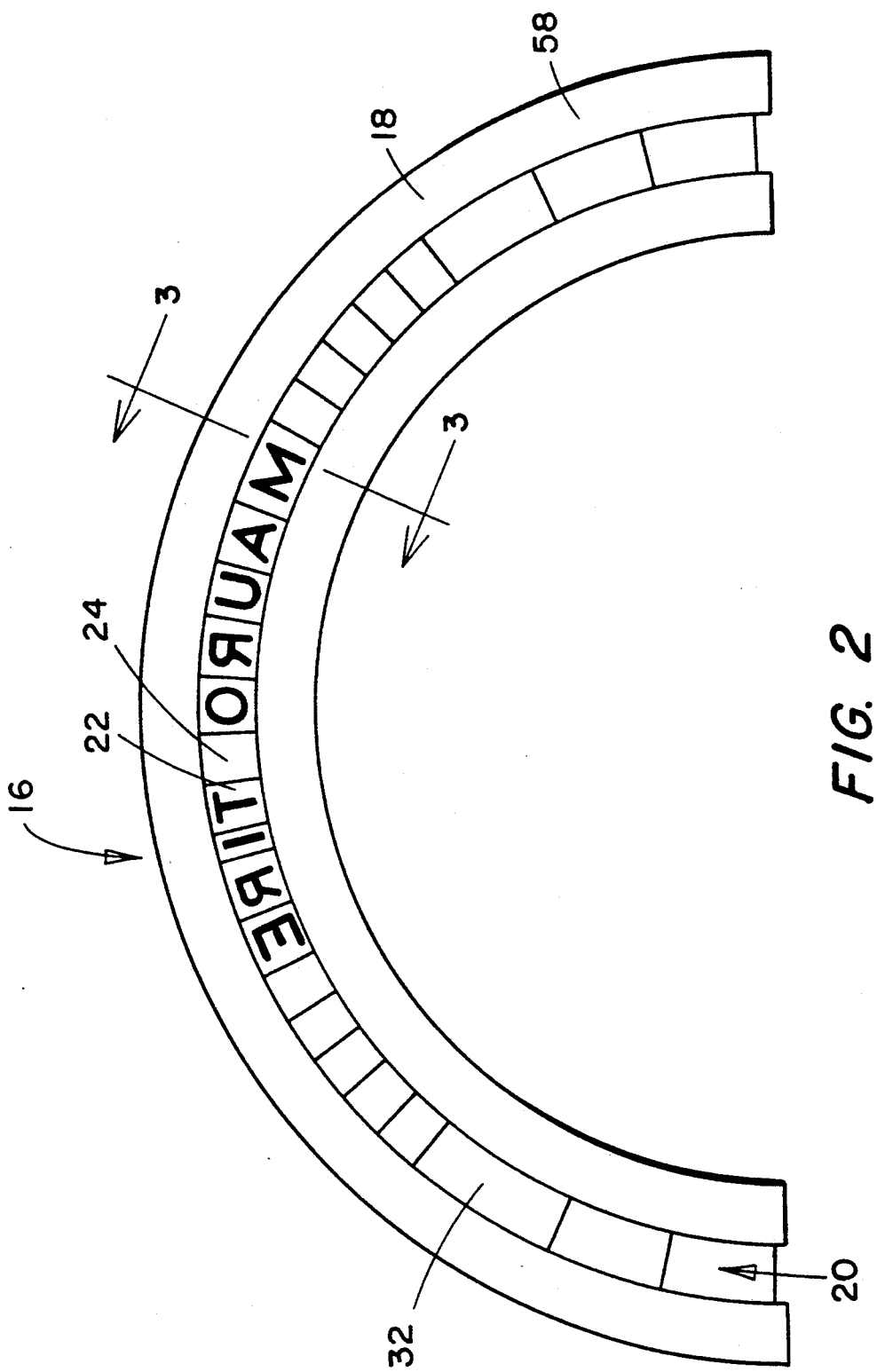
FIG. 2 is a side schematic view of a mold constructed in accordance with the invention with certain insert members positioned therein for producing the marking inditia indicated in FIG. 1.
Figure 5:
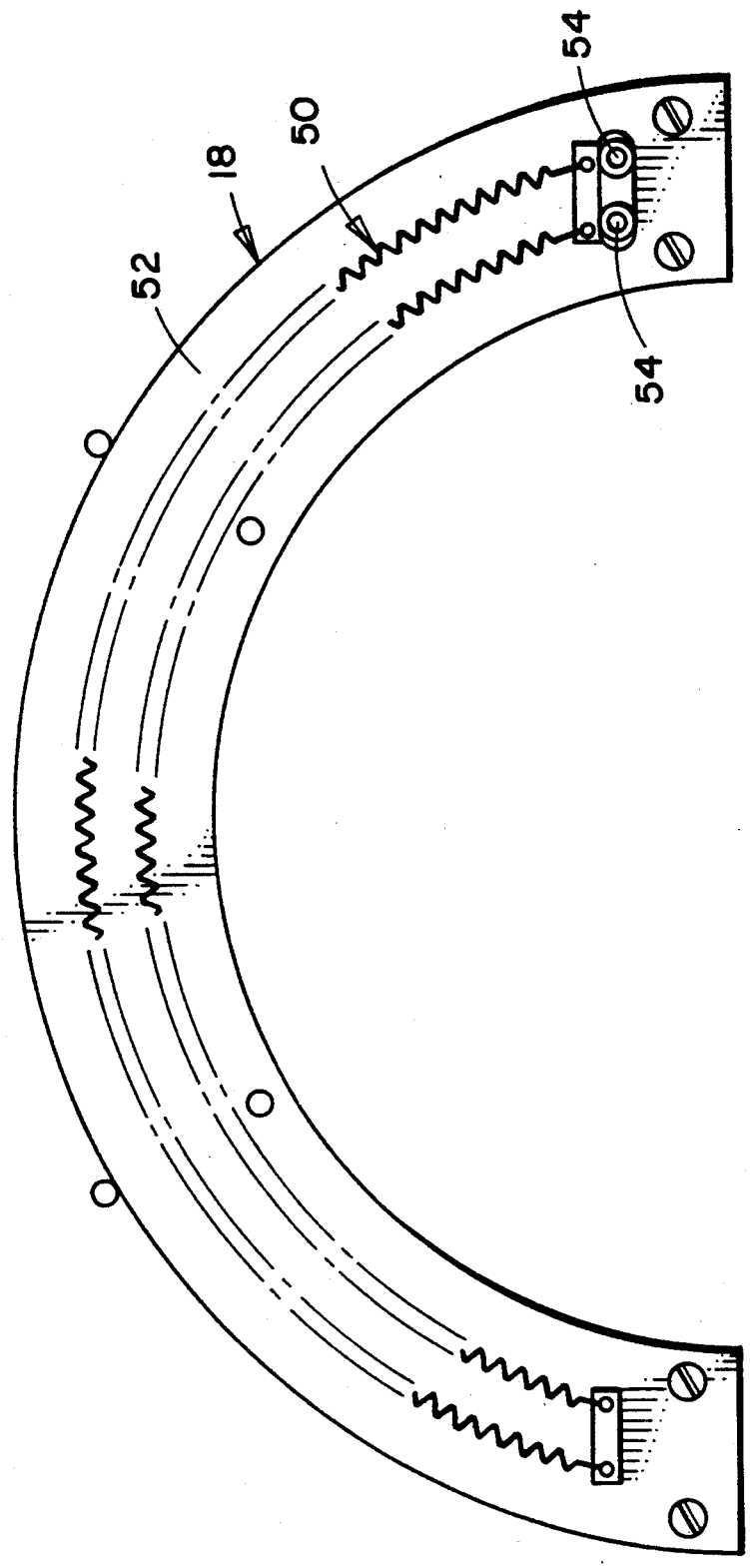
FIG. 5 is a rear perspective view of the mold illustrated in FIG. 2.

Referring to FIG. 1, there is illustrated therein an elastomeric or rubber tire 10 having a sidewall portion 12. A plurality of raised letters 14 are disposed along the sidewall 12 of the tire 10 in the form of inditia or a legend as illustrated therein. Each of the letters 14 consist of rubber material integrally bonded to the sidewall 12 of the tire 10.

Referring to FIGS. 2–5, a device 16 is provided for forming the letters 14 on the sidewall 12 of the tire 10. In preferred form, the device 16 is in the form of an arcuate or curved mold 18 having a central channel or slot 20 defined along the center portion of the mold 18.

The channel 20 is sized and shaped to enable a plurality of insert members 22, 24 to be positioned therein. In preferred form, the insert members 22, 24 are slidingly engaged within the channel 20 through the use of a tracking mechanism 26 as described below. Each insert member 22 includes a mold portion 28 engraved in the face 30 thereof in the form of a mirror image of an alphanumeric letter, such as a number or a letter. The mirror image is required in order to position the letter in proper form when formed on the sidewall 12 of the tire 10. Each of the insert members 24 has its face 30 plain or blank, in that there is no engraving therein. The insert members 24 function as spacers between words or phrases formed along the channel 20 by the insert members 22. This can be clearly illustrated in FIGS. 1 and 2. Spacer blocks 32 are also provided at the end portions of the channel 20 in order to simply fill the channel 20 and reduce the number of insert members 24 utilized at the peripheral ends of the mold 18.

The tracking mechanism 26 may be any type of tracking mechanism that allows sliding engagement between the insert members 22, 24 and the channel 20. In one preferred form, the tracking mechanism 26 is in the form of a tongue-and-groove arrangement and includes a pair of tracking members or tongues 34 disposed along the interior sides 36, 38 of the channel 20. A pair of grooves or notches 40 are provided along the sides 42, 44 of the insert members 22, 24 and are sized and shaped to matingly engage the tracks 34. In this manner, the insert members 22, 24 may readily slide along the channel 20 and yet be maintained in firm position therein due to the inter-engagement between the tracks 34 and the grooves 40. In this manner, insert members 22, 24 are then slidingly engaged within the channel 32 to form one or more words or phrases therein.

A heating coil 50 is provided on the backside 52 of the mold 18 proximate the center portion channel 20. In this manner, an electric current can be passed through the heating coil 50 through terminals 54 so as to heat the insert members 22, 24 from the backside thereof. Vulcanizing rubber, i.e., prevulcanized rubber, formed in accordance with any process well known in the art, is then injected into the mold portions 28 of the insert members 22 so as to form heated fluid rubber material 56 in the molds 28 as the insert members 22 are in position within the mold member 18. Such injection can be performed using any known method of rubber injection, further details being unnecessary. At this juncture, the sidewall 12 of the tire 10 is then placed against the face 58 of the mold 18 so as to engage the heated rubber 56 against the sidewall 12 of the tire 10. When this occurs, the heating coil 50 is deenergized so as to cool the rubber 56, thereby fusing the rubber 56 and the sidewall 12 so as to integrally bond the individual letters formed by the insert members 22 against the sidewall 12 of the tire 10. When the rubber and mold 18 have sufficiently cooled, the tire 10 is removed from engagement with the face 58 of the mold 18, and the bonded letters are then pulled from the molds 28 to form raised letters 14 along the sidewall 12 of the tire 10.

It should be noted that the device 16 is preferably portable in nature, and with a plurality of insert members 22 having different letters and numbers available therein, any number of different combinations can be put together to create a personalized term, name or phrase to be formed on the sidewall 12 of an existing vehicular tire 10. In this manner, any tire can be personalized with any type of message or name which a tire owner chooses. In one embodiment of the invention, the mold 18 is manufactured in sufficiently small size so that the letters 14 can be formed on an existing tire 10 without having to remove the tire 10 from the vehicle inasmuch as the mold 18 does not encase the entire tire 10, but only a portion thereof.

A wide variety of sizes of letters and numbers can be engraved on the insert members 22, and different kinds of colored rubbers may be utilized to provided any desired phraseology as well as coloring combination that a tire-owner would choose. In preferred form, the mold 18 is formed from aluminum to provide light weight as well as rapid heating and cooling.

As can be seen from the above, the present invention provides an economic method and device for producing markings and inditia of any desired size, shape or verbage on vehicular tires. The present invention enables a vehicle tire owner to customize and personalize their tires with any phrase, message or name that he chooses. The present invention is portable and light-weight so as to permit personalization of vehicular tires on site without even having to remove the tires from the vehicle, if desired. In this manner, the present invention provides an economic and simple way of marking the sidewall of a vehicular tire without custom mold manufacturing and the expense associated therewith.

The foregoing description and the illustrative embodiments of the present invention have been shown in the drawings and described in detail in varying modifications and alternate embodiments. It should be understood, however, that the foregoing description of the present invention is exemplary only, and that the scope of the invention is limited only to the claims as interpreted in view of the prior art.

I claim:

1. A device for producing raised lettering on elastomeric tires comprising:
   a mold member sized and shaped to receive at least a portion of the sidewall of an elastomeric tire;
   a channel disposed along the interior surface of said mold member;
   a plurality of insert members for positioning in said channel, each said insert member having a face engraved with the mirror image of a preselected alphanumeric symbol to form a female alphanumeric mold therein;
   a pair of tracking members positioned along the interior opposite sides of said channel for engagement with said insert members to align and positionally maintain said insert members therein to form a series of symbols into a preselected legend;
   means for injecting heated vulcanizing rubber into said symbol molds as the sidewall of said elastomeric tire is in contact with the faces of said insert members; and an electrical heating element imbedded in and disposed along the length of said mold member proximate said channel to heat said insert members to fuse said injected rubber directly to said tire sidewall to produce raised alphanumeric lettering of a preselected pattern on the sidewall of said tire.

2. The device as claimed in claim 1, wherein said mold member is annularly shaped and sized to receive approximately one-half of said elastomeric tire sidewall.

3. The device as claimed in claim 1, wherein said channel is disposed along the central portion of said mold member to center said preselected pattern of lettering along said sidewall.

4. The device as claimed in claim 1, wherein each said insert member includes a pair of grooves defined on opposite sides thereof sized and shaped for engagement with said tracking members to permit sliding engagement and movement along said channel to position said insert members along said channel.

5. The device as claimed in claim 1, wherein said device further includes a plurality of spacer insert members having planar faces without engraving for providing selective spacing between symbols and alphanumeric lettering.

6. The device as claimed in claim 1, wherein said electrical heating element comprises a heating coil imbedded in said mold member adjacent said channel.

7. A device for personalizing existing vehicular tires comprising:

a curved mold member sized and shaped to receive a portion of the sidewall of an elastomeric vehicular tire, said mold member defining a central slot having side surfaces and a bottom surface along the inner face thereof;

a plurality of symbol bearing members sized and shaped for positioning within said slot, each said member including a mirror-imaged alphanumeric symbol engraved in the face thereof to form a female alphanumeric mold;

a plurality of spacer members sized and shaped for selective positioning in said slot to form preselected spacing between said symbols or series of symbols;

means disposed along said slot side surface for guiding said symbol bearing members and said spacer members to position and maintain said members in said slot relative to each other;

means for injecting vulcanizing rubber into said female alphanumeric molds; and an electrical heating element imbedded in said mold member and disposed proximate said slot bottom surface adapted for heating said symbol bearing members to fuse said injected rubber directly against the sidewall of a vehicular tire placed in said curved mold member along the inner face thereof to form raised alphanumeric letters on said sidewall in accordance with a preselected pattern to personalize said tire.

8. The device as claimed in claim 7, wherein said curved mold member is sized to receive approximately one-half of the sidewall of said vehicular tire.

9. The device as claimed in claim 7, wherein said symbol bearing members and said spacer members comprise blocks adapted for placement within said slot.

10. The device as claimed in claim 9, wherein said guiding means comprises means for sliding said blocks into and within said slot.

11. The device as claimed in claim 10, wherein said sliding means comprises a tongue and groove arrangement between said blocks and said slot.

12. The device as claimed in claim 11, wherein said tongue comprises a pair of tracks with one said track disposed along each said side surface of said slot, and said groove comprises a pair of notches disposed along opposite sides of each said block for engagement with said tracks.

13. The device as claimed in claim 7, wherein said electrical heating element comprises a heating coil disposed in said mold member immediately adjacent said slot bottom surface to heat said symbol bearing members.

14. A method for producing raised alphanumeric lettering on existing elastomeric tire sidewalls comprising the steps of:

engraving mirror-image alphanumeric symbols in the face surface of a plurality of insert members, each said member having a single symbol;

sliding a plurality of said removable insert members along a slot disposed in a mold adapted to receive a portion of said tire sidewall, said insert members representing a preselected pattern of symbols with said mold including an electrical heating element imbedded therein;

injecting vulcanizing rubber into said engraved symbols;

placing said tire sidewall in said mold against said insert members;

heating said insert members with said electrical heating element to fuse said injected rubber directly against said original tire sidewall; and removing said tire from said mold thereby generating raised alphanumeric lettering in accordance with said pattern.

* * * * *